3,016,389
3,17-BISOXYGENATED-18-NOR-1,3,5(10)-ESTRA-TRIENES AND INTERMEDIATES

William F. Johns, Morton Grove, Ill., assignor to G. D. Searle & Co., Chicago, Ill., a corporation of Delaware
No Drawing. Filed Apr. 13, 1959, Ser. No. 805,657
13 Claims. (Cl. 260—397.4)

The present invention relates to steroidal compounds which are lacking the characteristic 13-methyl group and more specifically to 3,17-bisoxygenated-18-nor-1,3,5(10)-estratrienes and to intermediates for the preparation of same.

This invention is a continuation-in-part of my copending application, Serial No. 770,590, filed October 30, 1958, and now abandoned.

The instant compounds can be represented by the structural formula

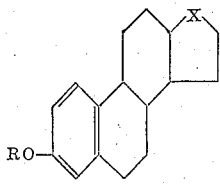

wherein R is selected from the group consisting of hydrogen, lower alkyl and lower alkanoyl radicals; and X is selected from the group consisting of carbonyl, hydroxymethylene, and (lower alkanoyl)oxymethylene radicals. Lower alkyl radicals represented by R are, for example, methyl, ethyl, propyl, butyl, amyl, hexyl, heptyl, octyl, and the branched-chain isomers of the foregoing. The radicals encompassed by the term "lower alkanoyl" are exemplified by formyl, acetyl, propionyl, butyryl, valeryl, caproyl, enanthyl, caprylyl and branched-chain isomers thereof, said groups being the acyl radicals of alkanoic acids containing fewer than 9 carbon atoms.

Suitable starting materials for the manufacture of the compounds of this invention are estradiol 3-(lower alkyl) ethers. As a specific example of the process involved, estradiol 3-methyl ether is treated first with boric acid at an elevated temperature then with a double bond splitting agent such as ozone, to afford 1-(3-oxobutyl)-7-methoxy-1,2,3,4,4a,9,10,10a-octahydrophenanthren-2-one. Cyclization of the latter substance, for example by reaction in methanol with aqueous potassium hydroxide, results in 12a-hydroxy-8-methoxy-1,2,3,4,4a,4b,5,6,10b,11,12,12a-dodecahydrochrysen-2-one which is then dehydrated, for example by further treatment with aqueous potassium hydroxide in methanol, to yield 8-methoxy-2,3,4,4a,4b,5,6,10b,11,12-decahydrochrysen-2-one. Reduction of the latter substance, preferably with lithium and liquid ammonia, affords 8-methoxy-1,2,3,4,4a,4b,5,6,7,10,10b,11,12,12a-tetradecahydrochrysen-2-ol. Oxidation of the latter alcohol, as exemplified by treatment with chromic acid, affords 8-methoxy-1,2,3,4,4a,4b,5,6,10b,11,12,12a-dodecahydrochrysen-2-one. Reaction of the latter ketone with methyl magnesium bromide followed by hydrolysis of the Grignard addition product yields a mixture of epimeric 2-methyl-8-methoxy-1,2,3,4,4a,4b,5,6,10b,11,12,12a-dodecahydrochrysen-2-ols which is dehydrated, preferably by reaction with thionyl chloride, to yield 2-methyl-8-methoxy-1,4,4a,4b,5,6,10b,11,12,12a-decahydrochrysene. Cleavage of the isolated double bond of the latter compound, preferably by ozonolysis, affords 1-formylmethyl-2-(2-oxopropyl)-7-methoxy-1,2,3,4,4a,9,10,10a-octahydrophenanthrene, which is then cyclized, for example by treatment with aqueous potassium hydroxide, to yield 3-methoxy-18,19-dinor-1,3,5(10),16-pregnatetraene-20-one. Elimination of the 17-acetyl side chain of the latter compound, for example by treatment with hydroxylamine followed by reaction with phosphorous oxychloride, results in 3-methoxy-18-nor-1,3,5(10)-estratrien-17-one.

The 3-(lower alkoxy)-18-nor-1,3,5(10)-estratrien-17-ols of the present invention can be prepared by reduction of the 3-(lower alkoxy)-18-nor-1,3,5(10)-estratrien-17-ones described supra, for example by reaction with lithium aluminum hydride in an inert solvent. This process is exemplified by the reaction of 3-methoxy-18-nor-1,3,5(10)-estratrien-17-one in ether with lithium aluminum hydride to yield 3-methoxy-18-nor-1,3,5(10)-estratrien-17-ol. Cleavage of the 3-(lower alkoxy) group of the 3-lower alkoxy)-18-nor-1,3,5(10)-estratrien-17-ols disclosed herein, for example by reaction with ethanolic potassium hydroxide, results in 3-hydroxy-18-nor-1,3,5(10)-estratrien-17-ol, also a compound of this invention. Oxidation of the latter alcohol, preferably by means of chromic acid, yields the instant 3-hydroxy-18-nor-1,3,5(10)-estratrien-17-one.

By acylating the claimed 3-hydroxy-18-nor-1,3,5(10)-estratrien-17-one, for example by reaction with an alkanoic acid anhydride in the presence of a suitable acid acceptor, the 3-(lower alkanoyl)oxy-18-nor-1,3,5(10)-estratrien-17-ones of the present invention are obtained. The pertinent process is exemplified by the reaction of 3-hydroxy-18-nor-1,3,5(10)-estratrien-17-one with acetic anhydride and pyridine to afford 3-acetoxy-18-nor-1,3,5(10)-estratrien-17-one. Acylation of 3-hydroxy-18-nor-1,3,5(10)-estratrien-17-ol with a limited quantity of the acylating agent affords a mixture which can be separated to afford three products, a 3,17-di-(lower alkanoyl)oxy-18-nor-1,3,5(10)-estratriene, a 3-(lower alkanoyl)oxy-18-nor-1,3,5(10)-estratrien-17-ol, and a 17-(lower alkanoyl)oxy-3-hydroxy-18-nor-1,3,5(10)-estratriene. For example, 3-hydroxy-18-nor-1,3,5(10)-estratrien-17-ol is reacted with acetic anhydride and pyridine and the resultant mixture separated chromatographically, resulting in three products, 3,17-diacetoxy-18-nor-1,3,5(10)-estratriene, 3-acetoxy-18-nor-1,3,5(10)-estratrien-17-ol, and 17-acetoxy-3-hydroxy-18-nor-1,3,5(10)-estratriene.

The 3,17-bisoxygenated-18-nor-1,3,5(10)-estratrienes of this invention are useful as a result of their valuable pharmacological properties. They have, for example, the capacity to decrease the serum concentration of cholesterol and the corresponding cholesterol/phospholipid ratio without at the same time producing the potent side effects characteristic of known estrogens adapted to regulation of cholesterol metabolism.

The invention will appear more fully from the examples which follow. These examples are set forth by way of illustration only and it will be understood that the invention is not to be construed as limited in spirit or in scope by the details contained therein as many modifications in materials and in methods will be apparent from this disclosure to those skilled in the art. In these examples, temperatures are given in degrees centigrade (° C.). Quantities of materials are expressed in parts by weight and in parts by volume which bear the same relation one to the other as kilograms to liters.

EXAMPLE 1

*1-(3-oxobutyl)-7-methoxy-1,2,3,4,4a,9,10,10a-octahydrophenanthrene-2-one*

A mixture of 100 parts by weight of estradiol 3-methyl ether and 25 parts by weight of boric acid is heated at 140° for 20 minutes. Distillation of the reaction mixture at reduced pressure yields a colorless oil.

The colorless oil is dissolved in a solution of 400 parts by volume of methylene chloride and 400 parts by volume of methanol and a stream of oxygen containing one equivalent of ozone is passed through at —70°. To this reaction mixture is added 40 parts by weight of zinc dust followed by 40 parts by volume of acetic acid and the temperature allowed to rise to 0° with efficient stirring. After 45 minutes the mixture is filtered, water and aqueous sodium bicarbonate added to the filtrate, and the latter extracted with chloroform. The chloroform extract is stripped of solvent in vacuo and the residue crystallized from acetone, yielding 1-(3-oxobutyl)-7-methoxy-1,2,3,4,4a,9,10,10a-octahydrophenanthrene-2-one, M.P. 119–120°, $[\alpha]_D = +98°$.

By substituting estradiol 3-butyl ether and otherwise proceeding according to the herein described processes, 1-(3-oxobutyl)-7-butoxy-1,2,3,4,4a,9,10,10a-octahydrophenanthren-2-one is obtained. This compound exhibits maxima in the infrared at 5.87, 6.23, 6.33 microns.

EXAMPLE 2

*12a-hydroxy-8-methoxy-1,2,3,4,4a,4b,5,6,10b,11,12,12a-dodecahydrochrysen-2-one*

To a solution of 6 parts by weight of 1-(3-oxobutyl)-7-methoxy-1,2,3,4,4a,9,10,10a-octahydrophenanthren-2-one in 600 parts by volume of methanol is added 60 parts by volume of 1% aqueous potassium hydroxide. The reaction mixture is allowed to stand at room temperature for 10 minutes, then diluted with water and extracted with benzene. The benzene extract is washed with water, dried over anhydrous magnesium sulfate and concentrated to dryness under reduced pressure. Chromatography of the residue by adsorption on silica gel and elution with a 10% ethyl acetate–90% benzene solution affords pure 12a-hydroxy-8-methoxy-1,2,3,4,4a,4b,5,6,10b,11,12,12a-dodecahydrochrysen-2-one, M.P. 197–200°.

By substituting 1-(3-oxobutyl)-7-butoxy-1,2,3,4,4a,9,10,10a-octahydrophenanthren-2-one and proceeding according to the herein described processes, 12a-hydroxy-8-butoxy-1,2,3,4,4a,4b,5,6,10b,11,12,12a-dodecahydrochrysen-2-one is obtained. It possesses maxima in the infrared at 2.97, 5.80, 6.22, and 6.33 microns.

EXAMPLE 3

*8-methoxy-2,3,4,4a,4b,5,6,10b,11,12-decahydrochrysen-2-one*

A solution of 54.9 parts by weight of 12a-hydroxy-8-methoxy-1,2,3,4,4a,4b,5,6,10b,11,12,12a-dodecahydrochrysen-2-one in 2200 parts by volume of methanol and 350 parts by volume of 10% aqueous potassium hydroxide is heated at reflux under nitrogen for 1 hour. The solution is cooled and diluted with water, and the resulting precipitate washed with water and dried, yielding 8-methoxy-2,3,4,4a,4b,5,6,10b,11,12-decahydrochrysen-2-one, M.P. 145–146°; $[\alpha]_D = +85°$.

By substituting an equivalent quantity of 12a-hydroxy-8-butoxy-1,2,3,4,4a,5,6,10b,11,12,12a-dodecahydrochrysen-2-one and otherwise proceeding according to the herein described processes, 8-butoxy-2,3,4,4a,4b,5,6,10b,11,12-decahydrochrysen-2-one is obtained. The latter substance exhibits maxima in the infrared at 5.97, 6.19, and 6.34 microns.

EXAMPLE 4

*8-methoxy-1,2,3,4,4a,4b,5,6,7,10,10b,11,12,12a-tetradecahydrochrysen-2-ol*

A solution of 46.7 parts by weight of 8-methoxy-2,3,4,4a,4b,5,6,10b,11,12-decahydrochrysen-2-one in 700 parts by volume of tetrahydrofuran is added to a solution of 1600 parts by volume of anhydrous liquid ammonia in 700 parts by volume of t-butanol over a period of 1 hour. During the same period a total of 32 parts by weight of lithium wire in portions of 5 parts by weight is also added. When the solution loses its color, after about 4 hours, the ammonia is evaporated and water added cautiously. The mixture is extracted with benzene and the benzene extract washed with water, dried over anhydrous sodium sulfate and concentrated to dryness, yielding 8-methoxy-1,2,3,4,4a,4b,5,6,7,10,10b,11,12,12a-tetradecahydrochrysen-2-ol, M.P. 180–182°.

By substituting an equivalent quantity of 8-butoxy-2,3,4,4a,5,6,10b,11,12-decahydrochrysen-2-one and otherwise proceeding according to the herein described processes, 8-butoxy-1,2,3,4,4a,4b,5,6,7,10,10b,11,12,12a-tetradecahydrochrysen-2-ol is obtained. Its infrared absorption spectrum possesses maxima at 2.91, 5.84, and 5.95 microns.

EXAMPLE 5

*8-methoxy-1,2,3,4,4a,4b,5,6,10b,11,12,12a-decahydrochrysen-2-one*

A solution of 37.6 parts by weight of 8-methoxy-1,2,3,4,4a,4b,5,6,7,10,10b,11,12,12a-tetradecahydrochrysen-2-ol in 400 parts by volume of pyridine is added to a solution of 40 parts by weight of chromium trioxide in 400 parts by volume of pyridine at 10°. The solution is allowed to stand overnight at room temperature, diluted with water and extracted with ether. The ether extract is washed with water, dried over anhydrous sodium sulfate, and concentrated to dryness, yielding 8-methoxy-1,2,3,4,4a,4b,5,6,10b,11,12,12a-dodecahydrochrysen-2-one M.P. 188–190°; $[\alpha]_D = +31°$.

By substituting an equivalent quantity of 8-butoxy-1,2,3,4,4a,4b,5,6,7,10,10b,11,12,12a-tetradecahydrochrysen-2-ol and otherwise proceeding according to the herein described processes 8-butoxy-1,2,3,4,4a,4b,5,6,10b,11,12,12a-dodecahydrochrysen-2-one is obtained. This compound exhibits maxima in the infrared at 5.82, 6.19, and 6.33 microns.

EXAMPLE 6

*2-methyl-8-methoxy-1,4,4a,4b,5,6,10b,11,12,12a-decahydrochrysene*

To a solution of 4 parts by weight of 8-methoxy-1,2,3,4,4a,4b,5,6,10b,11,12,12a-dodecahydrochrysen-2-one in 40 parts by volume of tetrahydrofuran and 1000 parts by volume of anhydrous ether is added 15 parts by volume of 3 molar methyl magnesium bromide in n-butyl ether. The mixture is stirred at reflux for 15 minutes and another portion of 15 parts by volume of the Grignard solution is added. The mixture is stirred at reflux for two hours longer, is then cooled and diluted with water and excess hydrochloric acid. The solution is extracted with benzene and the benzene extract washed with aqueous sodium bicarbonate solution, dried over anhydrous sodium sulfate and concentrated to dryness in vacuo. Crystallization of the residue from ether yields a mixture of epimeric 2-methyl-8-methoxy-1,2,3,4,4a,4b,5,6,10b,11,12,12a-dodecahydrochrysen-2-ols.

To a solution of 38 parts by weight of the above epimeric mixture in 40 parts by volume of pyridine at 0° is added a solution of 15 parts by volume of thionyl chloride dissolved in 40 parts by volume of pyridine at 0°. The reaction mixture is stirred for 1 hour at 0°, then water and aqueous potassium bicarbonate cautiously added. The mixture is extracted with chloroform, the extract washed first with aqueous potassium bicarbonate then with water, dried over anhydrous sodium sulfate and concentrated to dryness in vacuo. Chromatography of a petroleum ether solution of the residue on 400 parts by weight of silica gel followed by elution with 10% benzene in petroleum ether yields 2-methyl-8-methoxy-1,4,4a,4b,5,6,10b,11,12,12a-decahydrochrysene, M.P. 124–125°; $[\alpha]_D = -36°$ By substituting an equivalent quantity of 8-butoxy-1,2,3,4,4a,4b,5,6,10b,11,12,12a-dodecahydrochrysen-2-one and otherwise proceeding according to the herein described processes, 2-methyl-8-butoxy-1,4,4a,4b,5,6,10b,11,12,12a-decahydrochrysene is obtained. It exhibits maxima in the infrared at 6.21, 6.34, and 12.87 microns.

EXAMPLE 7

*1-formylmethyl-2-(2-oxopropyl)-7-methoxy-1,2,3, 4,4a,9,10,10a-octahydrophenanthrene*

A stream of oxygen containing one equivalent of ozone is passed through a solution of 0.57 part by weight of 2 - methyl - 8 - methoxy - 1,4,4a,4b,5,6,10b,11,12,12a-decahydrochrysene in 50 parts by volume of methylene chloride and 50 parts by volume of methanol at −70°. To this reaction mixture is added 3 parts by weight of zinc dust and 3 parts by volume of acetic acid and the mixture stirred with cooling by means of an ice-bath for 10 minutes. The filtered solution is washed with water and aqueous potassium bicarbonate, dried over anhydrous sodium sulfate and concentrated to dryness in vacuo. Crystallization from benzene-petroleum ether yields 1-formylmethyl-2-(2-oxopropyl) - 7 - methoxy - 1,2,3,4,4a,9,10,10a-octahydrophenanthrene, M.P. 143–143.5°.

By substituting an equivalent quantity of 2-methyl-8-butoxy - 1,4,4a,4b,5,6,10b,11,12,12a - decahydrochrysene and otherwise proceeding according to the herein described processes, 1 - formylmethyl - 2 - (2-oxopropyl)-7-butoxy-1,2,3,4,4a,9,10,10a-octahydrophenanthrene is obtained. The infrared absorption spectrum of the latter compound possesses maxima at 3.69, 5.85, 6.22, and 6.32 microns.

EXAMPLE 8

*3-methoxy-18,19-dinor-1,3,5(10),16-pregnatetraen-20-one*

A suspension of 8.42 parts by weight of 1-formylmethyl-2-(2-oxopropyl) - 7 - methoxy-1,2,3,4,4a,9,10,10a-octahydrophenanthrene in a solution of 5.2 parts by weight of potassium hydroxide in 260 parts by weight of water is refluxed under nitrogen for 4 hours. The cooled mixture is extracted with a chloroform-acetic acid solution, the extract washed with potassium bicarbonate solution and with water, dried over anhydrous sodium sulfate, and concentrated to dryness in vacuo. A solution of the residue in 10% benzene in petroleum ether is adsorbed on 300 parts by weight of acid-washed alumina and eluted with 50% benzene in petroleum ether. Recrystallization from acetone petroleum ether yields 3-methoxy-18,19-dinor-1,3,5(10),16 - pregnatetraen-20-one, M.P. 168–169°, $[\alpha]_D = +112°$.

By substituting an equivalent quantity of 1-formylmethyl - 2 - (2-oxopropyl) - 7 - butoxy - 1,2,3,4,9,10,10a-octahydrophenanthrene and otherwise proceeding according to the herein described processes, 3-butoxy-18,19-dinor-1,3,5(10),16-pregnatetraen-20-one, which exhibits maxima in the infrared at 5.99, 6.21, and 6.30 microns, is obtained.

EXAMPLE 9

*3-methoxy-18-nor-1,3,5(10)-estratrien-17-one*

A solution of 7 parts by weight of 3-methoxy-18,19-dinor-1,3,5(10),16-pregnatetraen-20-one and 15 parts by weight of hydroxylamine hydrochloride in 200 parts by volume of pyridine is heated at 100° for 1½ hours. The reaction mixture is cooled, diluted with water and the resultant precipitate collected by filtration and washed on the filter with water.

A solution of 6.8 parts by weight of the latter precipitate in 50 parts by volume of pyridine is added at 0° to a solution of 20 parts by volume of phosphorous oxychloride in 50 parts by volume of pyridine and the resulting mixture allowed to stand at 0° for 3 hours. It is then added cautiously with stirring to a mixture of 35 parts by volume of concentrated aqueous hydrochloric acid with 200 parts by weight of ice. Stirring is continued for 5 minutes and the precipitate collected by filtration, washed with water, and dissolved in methylene chloride. The organic solution is washed successively with potassium bicarbonate and water, dried over anhydrous sodium sulfate, and evaporated to dryness in vacuo. Chromatography of the residue on silica gel followed by elution with a 5% ethyl acetate-95% benzene solution and recrystallization from methanol affords 3-methoxy-18 - nor - 1,3,5(10) - estratrien - 17 - one, M.P. 161–163°; $[\alpha]_D = +188°$.

By substituting an equivalent quantity of 3-butoxy-18,19 - dinor - 1,3,5(10),16 - pregnatetraen - 20 - one and otherwise proceeding according to the herein described processes, 3 - butoxy - 18 - nor - 1,3,5(10) - estratrien-17-one is obtained. This substance exhibits maxima in the infrared at 5.74, 6.22, and 6.36 microns.

EXAMPLE 10

*3-methoxy-13α-18-nor-1,3,5(10)-estratrien-17-one*

A solution of 2 parts by weight of 3-methoxy-18-nor-1,3,5(10)-estratrien-17-one in 100 parts by volume of methanol and 20 parts by volume of 10% aqueous potassium hydroxide is heated at reflux for 1 hour. The reaction mixture is cooled and diluted with water, and the resulting precipitate collected by filtration, washed with water, and dried. Chromatography of the residue by adsorption on silica gel and elution with benzene followed by recrystallization from methanol yields 3-methoxy - 13α - 18 - nor - 1,3,5(10) - estratrien - 17 - one, M.P. 121–122°.

By substituting an equivalent quantity of 3-butoxy-18-nor-1,3,5(10)-estratrien-17-one and otherwise proceeding according to the herein described processes, 3-butoxy-13α - 18 - nor - 1,3,5(10) - estratrien - 17 - one is obtained. The infrared absorption spectrum of the latter material exhibits maxima at 5.78, 6.21, and 6.34 microns.

EXAMPLE 11

*3-methoxy-18-nor-1,3,5(10)-estratrien-17-ol*

A solution of 7.5 parts by weight of 3-methoxy-18-nor-1,3,5(10)-estratrien-17-one in 1000 parts by volume of ether is added dropwise, at 0°, to a mixture of 10 parts by weight of lithium aluminum hydride and 1000 parts by volume of ether. The reaction mixture is treated cautiously with water in order to decompose the excess hydride, acidified wtih aqueous hydrochloric acid, then extracted with ether. The organic extract is washed successively with water and aqueous potassium bicarbonate, dried over anhydrous magnesium sulfate, and concentrated to dryness under reduced pressure to afford 3-methoxy - 18 - nor - 1,3,5(10) - estratrien - 17 - ol. Chromatography of the latter substance on silica gel followed by successive elutions with a 5% ethyl acetate-95% benzene solution yields 3 - methoxy - 18 - nor - 1,3,5(10)-estratrien-17α-ol, which possesses maxima in the infrared at 3.10, 6.21, and 6.37 microns; and 3-methoxy-18-nor-1,3,5(10)-estratrien-17β-ol. Recrystallization of the latter compound from benzene-petroleum ether affords the pure substance, M.P. 158–160°.

By substituting an equivalent quantity of 3-butoxy-18 - nor - 1,3,5(10) - estratrien - 17 - one and otherwise proceeding according to the herein described processes, 3 - butoxy - 18 - nor - 1,3,5(10) - estratrien - 17α - ol and 3 - butoxy - 18 - nor - 1,3,5(10) - estratrien - 17β - ol are obtained. These compounds exhibit maxima in the infrared at 3.11, 6.19, and 6.34; and 2.79, 6.20, and 6.34 microns, respectively.

EXAMPLE 12

*3-hydroxy-18-nor-1,3,5(10)-estratrien-17-ol*

A mixture of 3.5 parts by weight of 3-methoxy-18-nor-1,3,5(10)-estratrien-17β-ol, 70 parts by weight of potassium hydroxide and 400 parts by volume of ethanol is heated in an autoclave at 200° for 24 hours. The solution is cooled, diluted with water, and acidified, and the resulting precipitate collected by filtration. Crystallization from ethanol yields pure 3 - hydroxy - 18 - nor - 1,3,5(10)-estratrien-17β-ol, M.P. 251–253°.

By substituting 3-methoxy-18-nor-1,3,5(10)-estratrien-17α-ol and otherwise proceeding according to the herein described processes, 3-hydroxy-18-nor-1,3,5(10)-estratrien-17α-ol is obtained. It exhibits maxima in the infrared at 2.92, 3.16, 6.20, and 6.34 microns.

EXAMPLE 13

*3-hydroxy-18-nor-1,3,5(10)-estratrien-17-one*

To a solution of 3 parts by weight of 3-hydroxy-18-nor-1,3,5(10)-estratrien-17-ol in 1000 parts by volume of acetone is added dropwise, at 5°, 4 parts by volume of 4 normal chromium trioxide solution in aqueous sulfuric acid. The reaction mixture is stirred for 5 minutes longer, then diluted with water and extracted with benzene. The benzene extract is washed successively with water and aqueous potassium bicarbonate then evaporated to dryness in vacuo to afford 3-hydroxy-18-nor-1,3,5(10) - estratrien - 17 - one. Recrystallization of the latter from acetone yields the pure compound, M.P. 245–248°. Its infrared absorption spectrum possesses maxima at 3.07, 5.84, 6.21, and 6.35 microns.

EXAMPLE 14

*3-acetoxy-18-nor-1,3,5(10)-estratrien-17-one*

A mixture of 1 part by weight of 3-hydroxy-18-nor-1,3,5(10)-estratrien-17-one, 20 parts by volume of pyridine, and 10 parts by volume of acetic anhydride is allowed to stand at room temperature for 24 hours; then diluted with water. The resulting precipitate is collected by filtration, washed with water, and recrystallized from aqueous acetone to afford pure 3 - acetoxy - 18 - nor - 1,3,5(10)-estratrien-17-one. Its infrared absorption spectrum possesses maxima at 5.68, 5.76, 6.22, and 6.31 microns.

By substituting an equivalent quantity of isobutyric anhydride and otherwise proceeding according to the herein described processes, 3-isobutyroxy-18-nor-1,3,5(10)-estratrien-17-one, whose infrared absorption spectrum possesses maxima at 5.68, 5.76, 6.22, and 6.31 microns, is obtained.

EXAMPLE 15

*3-17-diacetoxy-18-nor-1,3,5(10)-estratriene*

To a solution of 1 part by weight of acetic anhydride in 100 parts by volume of pyridine is added, at 0°, 2.72 parts by weight of 3-hydroxy-18-nor-1,3,5(10)-estratrien-17-ol and the reaction mixture allowed to stand at room temperature for 16 hours. Diluting the mixture with water affords a precipitate which is collected by filtration and dried. Chromatography of this precipitate on silica gel followed by elution with benzene results in 3,17-diacetoxy-18-nor-1,3,5(10)-estratriene which exhibits maxima in the infrared at 5.68, 5.75, 6.21, and 6.33 microns.

By further successive elutions of the chromatographic column with 2% ethyl acetate in benzene, 3-acetoxy-18-nor-1,3,5(10)-estratrien-17-ol and 17-acetoxy-3-hydroxy-18-nor-1,3,5(10)-estratriene are obtained. The former substance possesses maxima in the infrared at 3.02, 5.68, 6.22 and 6.35 microns, while the infrared spectrum of the latter compound exhibits maxima at 3.05, 5.75, 6.22 and 6.34 microns.

By substituting valeric anhydride and otherwise proceeding according to the herein described processes; 3,17-divaleryloxy-18-nor-1,3,5(10)-estratriene, 3 - valeryloxy-18-nor-1,3,5(10)-estratrien-17-ol, and 17-valeryloxy-3-hydroxy-18-nor-1,3,5(10)-estratriene are obtained. The infrared absorption spectra of the latter three compounds exhibit maxima at 5.68, 5.75, 6.21, and 6.33; 3.02, 5.68, 6.22, and 6.35; and 3.02, 5.68, 6.22, and 6.35 microns, respectively.

What is claimed is:

1. A compound of the structural formula

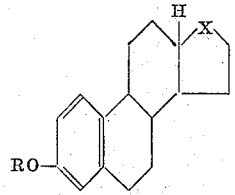

wherein R is selected from the group consisting of hydrogen, lower alkyl, and lower alkanoyl radicals; and X is selected from the group consisting of carbonyl, hydroxymethylene, and (lower alkanoyl)oxymethylene radicals.

2. 3-methoxy-18-nor-1,3,5(10)-estratrien-17-one.
3. 3-hydroxy-18-nor-1,3,5(10)-estratrien-17-one.
4. 3-methoxy-18-nor-1,3,5(10)-estratrien-17-ol.
5. 3-hydroxy-18-nor-1,3,5(10)-estratrien-17-ol.
6. 1-(3-oxobutyl)-7 - methoxy-1,2,3,4,4a,9,10,10a-octahydrophenanthren-2-one.
7. 12a-hydroxy-8-methoxy - 1,2,3,4,4a,4b,5,6,10b,11,12,12a-dodecahydrochrysen-2-one.
8. 8-methoxy-2,3,4,4a,4b,5,6,10b,11,12-decahydrochrysen-2-one.
9. 8-methoxy-1,2,3,4,4a,4b,5,6,7,10,10b,11,12,12a-tetradecahydrochrysen-2-ol.
10. 8-methoxy-1,2,3,4,4a,4b,5,6,10b,11,12,12a-dodecahydrochrysen-2-one.
11. 2-methyl - 8 - methoxy-1,4,4a,4b,5,6,10b,11,12,12a-decahydrochrysene.
12. 1-formylmethyl -2-(2-oxopropyl)-7-methoxy-1,2,3,4,4a,9,10,10a-octahydrophenanthrene.
13. 3-methoxy-18,19-dinor-1,3,5(10),16-pregnatetraen-20-one.

References Cited in the file of this patent

UNITED STATES PATENTS

| | | |
|---|---|---|
| 2,648,679 | Johnson et al. | Aug. 11, 1953 |
| 2,775,603 | Sheehan | Dec. 25, 1956 |
| 2,854,459 | Knowles et al. | Sept. 30, 1958 |
| 2,864,818 | Arth et al. | Dec. 16, 1958 |
| 2,894,000 | Sarett | July 7, 1959 |

OTHER REFERENCES

Marrian et al.: J. Biochem., vol. 26, pages 25–31 (1932).
Goldberg et al.: Helv. Chim. Acta, vol. 24, pages 295–302 (1941).
Pearlman et al.: J. Biol. Chem., vol. 173, pages 175–83 (1948).
Heusser et al.: Helv. Chim. Acta, vol. 33, pages 2243–50 (1950).
Kaufmann et al.: J.A.C.S., vol. 72, pgs. 4531–4 (1950).
Johnson et al.: J.A.C.S., vol. 74, pages 2832–49 (1952).
Wilds et al.: J.A.C.S., vol. 75, pages 5366–9 (1953).